(12) United States Patent
Campos et al.

(10) Patent No.: US 7,627,620 B2
(45) Date of Patent: Dec. 1, 2009

(54) DATA-CENTRIC AUTOMATIC DATA MINING

(75) Inventors: Marcos M. Campos, Cambridge, MA (US); Boriana L. Milenova, Somerville, MA (US); Peter J. Stengard, St Pete Beach, FL (US)

(73) Assignee: Oracle International Corporation, Redwood Shores, CA (US)

( * ) Notice: Subject to any disclaimer, the term of this patent is extended or adjusted under 35 U.S.C. 154(b) by 427 days.

(21) Appl. No.: 11/012,350

(22) Filed: Dec. 16, 2004

(65) Prior Publication Data

US 2006/0136462 A1 Jun. 22, 2006

(51) Int. Cl.
*G06F 12/00* (2006.01)
*G06F 17/00* (2006.01)

(52) U.S. Cl. .............................. 707/205; 707/1; 707/3; 707/5; 707/10

(58) Field of Classification Search ........................ None
See application file for complete search history.

(56) References Cited

U.S. PATENT DOCUMENTS

| | | | |
|---|---|---|---|
| 5,940,825 A * | 8/1999 | Castelli et al. ................. | 707/6 |
| 6,553,366 B1 * | 4/2003 | Miller et al. .................... | 707/2 |
| 6,636,860 B2 * | 10/2003 | Vishnubhotla .............. | 707/100 |
| 6,804,669 B2 * | 10/2004 | Aggarwal ....................... | 707/6 |
| 6,873,984 B1 * | 3/2005 | Campos et al. ................. | 707/6 |
| 7,007,020 B1 * | 2/2006 | Chen et al. ..................... | 707/6 |
| 7,099,880 B2 * | 8/2006 | Arning et al. ................ | 707/100 |
| 7,136,850 B2 * | 11/2006 | Keller et al. .................... | 707/4 |
| 7,188,110 B1 * | 3/2007 | Ludtke et al. .................. | 707/10 |
| 7,349,919 B2 * | 3/2008 | Russell et al. ............... | 707/102 |
| 7,415,445 B2 * | 8/2008 | Forman ........................ | 706/20 |
| 2003/0212678 A1 * | 11/2003 | Bloom et al. ................... | 707/6 |
| 2003/0225774 A1 * | 12/2003 | Davidov et al. ............. | 707/100 |
| 2004/0128287 A1 * | 7/2004 | Keller et al. .................... | 707/3 |
| 2004/0148267 A1 * | 7/2004 | Forman ........................ | 706/46 |
| 2006/0047657 A1 * | 3/2006 | Frieder et al. ................... | 707/9 |

\* cited by examiner

*Primary Examiner*—Tim T. Vo
*Assistant Examiner*—Jay A Morrison
(74) *Attorney, Agent, or Firm*—Hanify & King, P.C.

(57) ABSTRACT

A data-centric data mining technique provides greater ease of use and flexibility, yet provides high quality data mining results by providing general methodologies for automatic data mining. A methodology for each major type of mining function is provided, including: supervised modeling (classification and regression), feature selection, and ranking, clustering, outlier detection, projection of the data to lower dimensionality, association discovery, and data source comparison. A method for data-centric data mining comprises invoking a data mining feature to perform data mining on a data source, performing data mining on data from the data source using the data mining feature, wherein the data mining feature uses data mining processes and objects internal to the data mining feature and does not use data mining processes and objects external to the data mining feature, outputting data mining results from the data mining feature, and removing all data mining processes and objects internal to the data mining feature that were used to process the data from the data source.

63 Claims, 10 Drawing Sheets

Fig. 2

| Dealership ID | Week | Sales Offset (Actual Sales – Predicted Sales) | | | |
|---|---|---|---|---|---|
| | | 29 | 30 | 31 | 32 |
| 23454 | | $1,824 | $12,745 | -$531 | $34 |
| 65456 | | $896 | $-719 | $1,547 | $318 |
| 72391 | | $-4,398 | $-895 | $1,306 | $2,013 |
| 20453 | | $3,021 | $938 | $1,284 | $565 |
| 31485 | | $8,346 | $4,002 | -$1,229 | -$7,571 |

INPUT DATA TABLE

Dataset: BOSTON_HOUSING_DATA

SQL> desc BOSTON_HOUSING_DATA

| Name | Type |
|---|---|
| ID | NUMBER |
| CRIME | NUMBER |
| ZONING | NUMBER |
| INDUSTRIAL | NUMBER |
| CHARLES RIVER | NUMBER |
| NITRIC OXIDE | NUMBER |
| ROOMS | NUMBER |
| HOUSE AGE | NUMBER |
| DISTANCE | NUMBER |
| HWY ACCESS | NUMBER |
| TAX RATE | NUMBER |
| PUPIL-TEACHER | NUMBER |
| B | NUMBER |
| LOWER STATUS | NUMBER |
| MEDIAN VALUE | NUMBER |

Fig. 3b

304
PROCEDURE CALL

BEGIN
 DBMS_PREDICTIVE_ANALYTICS.EXPLAIN(
data_table_name   => 'BOSTON_HOUSING_DATA',
explain_column_name   => '"MEDIAN VALUE"',
result_table_name => 'BOSTON_HOUSING_EXPLAIN_RESULT');
   END;

SELECT * FROM BOSTON_HOUSING_EXPLAIN_RESULT;

Fig. 3c

306
RESULT TABLE

| ATTRIBUTE_NAME | EXPLANATORY VALUE | RANK |
|---|---|---|
| LOWER STATUS | .124598457 | 1 |
| ROOMS | .081370093 | 2 |
| CRIME | .040693344 | 3 |
| NITRIC OXIDE | .010847462 | 4 |
| INDUSTRIAL | .007416427 | 5 |
| PUPIL-TEACHER | .000488299 | 6 |
| TAX RATE | 0 | 7 |
| ZONING | 0 | 7 |
| CHARLES RIVER | 0 | 7 |
| B | 0 | 7 |
| DISTANCE | 0 | 7 |
| HWY ACCESS | 0 | 7 |
| HOUSE AGE | 0 | 7 |

400

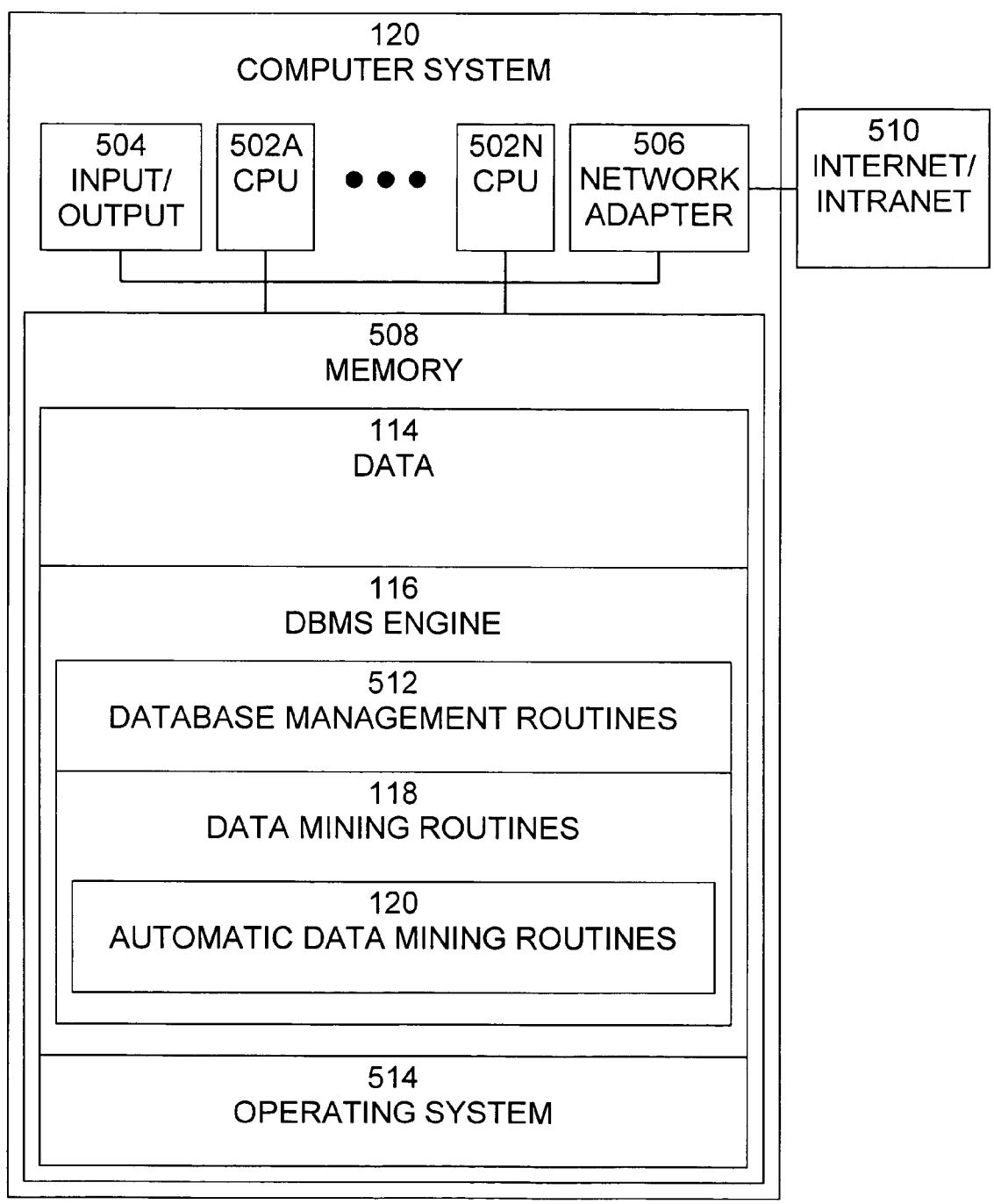

DATA-CENTRIC AUTOMATIC DATA MINING

BACKGROUND OF THE INVENTION

1. Field of the Invention

The present invention relates to a system, method, and computer program product for performing data-centric automatic data mining.

2. Description of the Related Art

Data mining is a technique by which hidden patterns may be found in a group of data. True data mining doesn't just change the presentation of data, but actually discovers previously unknown relationships among the data. Data mining is typically implemented as software in or in association with database systems. There are two main areas in which the effectiveness of data mining software may be improved. First, the specific techniques and processes by which the data mining software discovers relationships among data may be improved. Such improvements may include speed of operation, more accurate determination of relationships, and discovery of new types of relationships among the data. Second, given effective data mining techniques and processes, the results of data mining are improved by obtaining more data. Additional data may be obtained in several ways: new sources of data may be obtained, additional types of data may be obtained from existing sources of data, and additional data of existing types may be obtained from existing sources.

Data mining is a hard thing to do. It requires complex methodology, data preparation, and tuning from the user to be successful. This makes data mining more of an art and has limited the acceptance and dissemination of the technology. The concepts and methodologies used in data mining are also foreign to database users in general. Database users work from a data-centric query paradigm against a data source. Supervised modeling in data mining, an important subset which includes classification and regression modeling, in most cases, requires two sources: a training data set and an apply data set. The conceptual hurdle posed by data mining has been handled by providing users with templates. These templates encapsulate a complex methodology, usually suitable to a narrow problem domain, into a series of steps that can be tuned by the user. In some cases templates also provide defaults based on heuristics thus minimizing the need for tuning and user input. Templates can be parameterized and deployed for further ease of use.

Previous solutions based on templates are not general enough to support different data source schemas, don't automatically identify the type of predictive technique (classification or regression) to use for different target types in supervised problems, and don't work out of a single data source for supervised cases. Another limitation of templates is their inability to seamlessly update the results produced without the need for user intervention or requiring the user to perform multiple operations (e.g., build, and then deploy solution for scoring).

A need arises for a data-centric data mining technique that provides greater ease of use and flexibility, yet provides high quality data mining results.

SUMMARY OF THE INVENTION

The present invention provides a data-centric data mining technique that provides greater ease of use and flexibility, yet provides high quality data mining results by providing general methodologies for automatic data mining. The invention provides a methodology for each major type of mining function, including: supervised modeling (classification and regression), feature selection and ranking, clustering, outlier detection, projection of the data to lower dimensionality, association discovery, and data source comparison. The invention hides these methodologies from the user and presents them through a consistent set of high-level interfaces, which can be implemented as a SQL operator, a script, a procedure, or a web service. These high-level interfaces hide the data mining concepts away from the users thus helping to bridge the conceptual gap usually associated with data mining. The invention automatically determines the type of technique (classification or regression) if it is a supervised problem, selects the correct algorithm, performs the appropriate data preparation steps for the chosen algorithm, and tunes the model settings to obtain good accuracy. To closely support the data-centric query paradigm familiar to database users, the invention either builds models on the fly or attaches them to data sources (tables or views). The invention also only requires a single data source as an input for supervised problems. It also can either produce static results that are persisted to a table or, through a view, dynamic results that, when queried, reflect the current data in the source table.

In one embodiment of the present invention, a method for data-centric data mining comprises invoking a data mining feature to perform data mining on a data source, performing data mining on data from the data source using the data mining feature, wherein the data mining feature uses data mining processes and objects internal to the data mining feature and does not use data mining processes and objects external to the data mining feature, outputting data mining results from the data mining feature, and removing all data mining processes and objects internal to the data mining feature that were used to process the data from the data source.

In one aspect of the present invention, the user does not need to specify data preparation to be performed on the data source, regardless of the data source. The data mining features perform tasks based on needs and perspectives of the user without exposing to the user data mining specific terminologies and methodologies.

In one embodiment of the present invention, a method for data-centric data mining comprises invoking a data mining feature to perform data mining on a data source, attaching an existing data mining model to the data source, performing data mining on data from the data source using the data mining feature, wherein the data mining feature uses the attached data mining model, outputting data mining results from the data mining feature, and removing all data mining processes and objects internal to the data mining feature that were used to process the data from the data source.

In one aspect of the present invention, performing data mining comprises building a data mining model on the fly at functional index construction time or performing data mining comprises using a data mining model that was built prior to invoking the data mining feature.

In one aspect of the present invention, the data mining features comprise at least one of an EXPLAIN data mining feature that identifies attributes that are important or useful for explaining variation on a target attribute of interest and that provides a ranking of the attributes and a figure of merit, a PREDICT data mining feature that produces predictions for unknown targets for classification mining tasks and regression mining tasks, a GROUP data mining feature that clusters similar records together and provides description for the groups, a DETECT data mining feature that identifies records in the data from the data source that are atypical, outliers, or anomalies, a PROJECT data mining feature that projects the data from the data source to a space of lower dimensionality and provides description of newly created attributes, a DISCOVER data mining feature that uncovers hidden patterns in the data from the data source and provides a list of discovered patterns, and a COMPARE data mining feature that compares content of two data sources and produces a summary of differences and similarities discovered.

In one aspect of the present invention, the data mining is performed by receiving data upon which to perform data mining processing, computing statistics on the received data, building a data mining model using the received data and based on the computed statistics, determining a quality of results of the built data mining model, selecting a data mining model based on the determined quality of results, and applying the selected data mining model to the received data to generate applied data.

In one aspect of the present invention, computing the statistics comprises computing a number of distinct values for each predictor attribute and the target attribute, computing a number of total records included in the input training data, computing bin boundaries when discretization is performed, and computing shift and scale values for attributes where normalization is performed.

In one aspect of the present invention, building a data mining model based on the computed statistics comprises determining an appropriate data mining function and algorithm to be used, providing parameters to a build process of the data mining model so as to generate an optimal model, selecting a data mining model based on the computed statistics, and adjusting model creation parameters of the selected model based on the computed statistics.

In one aspect of the present invention, determining a quality of results of the built data mining model comprises evaluating results of the built data mining models using a confusion matrix, for classification models and evaluating results of the built data mining models using computed measures of accuracy of the built data mining models, for regression models. The computed measures of accuracy include at least one of a mean absolute error or a root mean square error, for regression models.

In one aspect of the present invention, the method further comprises preparing the received data before building the data mining model. Preparing the received data comprises at least one of discretization of continuous attributes, outlier handling, normalization of continuous attributes, missing values treatment for continuous and categorical attributes, and randomized sampling of input data to use for model building and testing.

In one aspect of the present invention, the method further comprises analyzing the applied data resulting from applying the selected data mining model to the received data. Analyzing the applied data comprises, if the data mining model is a binary classification data mining model, performing receiver operating characteristics analysis of the applied data to generate predictions, and adjusting the predictions to support an optimal probability threshold resulting in the best trade-off between True Positive Rate and False Positive Rate. The method further comprises producing result data based on the analyzed applied data. Producing result data comprises generating a result table based on the analyzed applied data wherein the optimized probability threshold is used to determine a prediction.

In one aspect of the present invention, the method is used to produce predictions for known and unknown targets. The received data contains records where the target value is known and records where the target value is not known. Building the data mining model comprises building the data mining model using only the records where the target value is known. Applying the selected data mining model comprises scoring the data mining model using both the records where the target value is known and the records where the target value is not known.

In one aspect of the present invention, the data source comprises at least one of a relational table or view in a relational database, multidimensional (OLAP) data, a flat file (external tables), or a data streams.

BRIEF DESCRIPTION OF THE DRAWINGS

Further features and advantages of the invention can be ascertained from the following detailed description that is provided in connection with the drawings described below:

FIG. 2 is an example of a use case for the PREDICT feature.

FIG. 3a is an exemplary schema of an input data table.

FIG. 3b is an example of a procedure call for the EXPLAIN feature.

FIG. 3c is an example of an output table of results from the EXPLAIN feature.

FIG. 5 is an exemplary block diagram of a database management system, in which the present invention may be implemented.

DETAILED DESCRIPTION OF THE PREFERRED EMBODIMENTS

The present invention provides a methodology for several major types of mining functions, including: supervised modeling (classification and regression), feature selection and ranking, clustering, outlier detection, projection of the data to lower dimensionality, association discovery, and data source comparison. The invention hides these methodologies from the user and presents them through a consistent set of interfaces, which can be implemented as SQL operators, scripts, procedures, or web services. The invention automatically determines the type of technique (classification or regression) if it is a supervised (PREDICT) problem, selects the correct algorithm, performs the appropriate data preparation steps for the chosen algorithm, and tunes the model settings to obtain good accuracy. The invention takes a data-centric approach to data mining, which is compatible to the query-centric way of work of RDBMS users. In the present invention, from the user's point of view the analytic activity is associated with the processing of the data source itself at query time and doesn't require exogenous activities or objects. This is accomplished by performing data mining at the time of execution of a feature (e.g., PREDICT) and leaving no materialized data mining related objects (e.g., data mining models) after the processing is completed. An alternative implementation attaches a data mining model to the data source and mirrors the process of building a functional index. The data mining model can be built on the fly, hidden from the user, at the functional index construction time, or pre-built elsewhere and attached to the table at the index construction time. This second approach can be used in conjunction with an operator-based implementation of the invention. If the operator-based implementation is invoked without the index-building step the methodology is fully executed. If a functional index has already been provided then the results are already computed and only need to be retrieved. Much like the execution of complex queries, if an index has been created the query returns results more quickly, otherwise the processing can take a significant amount of time.

Figure 1:
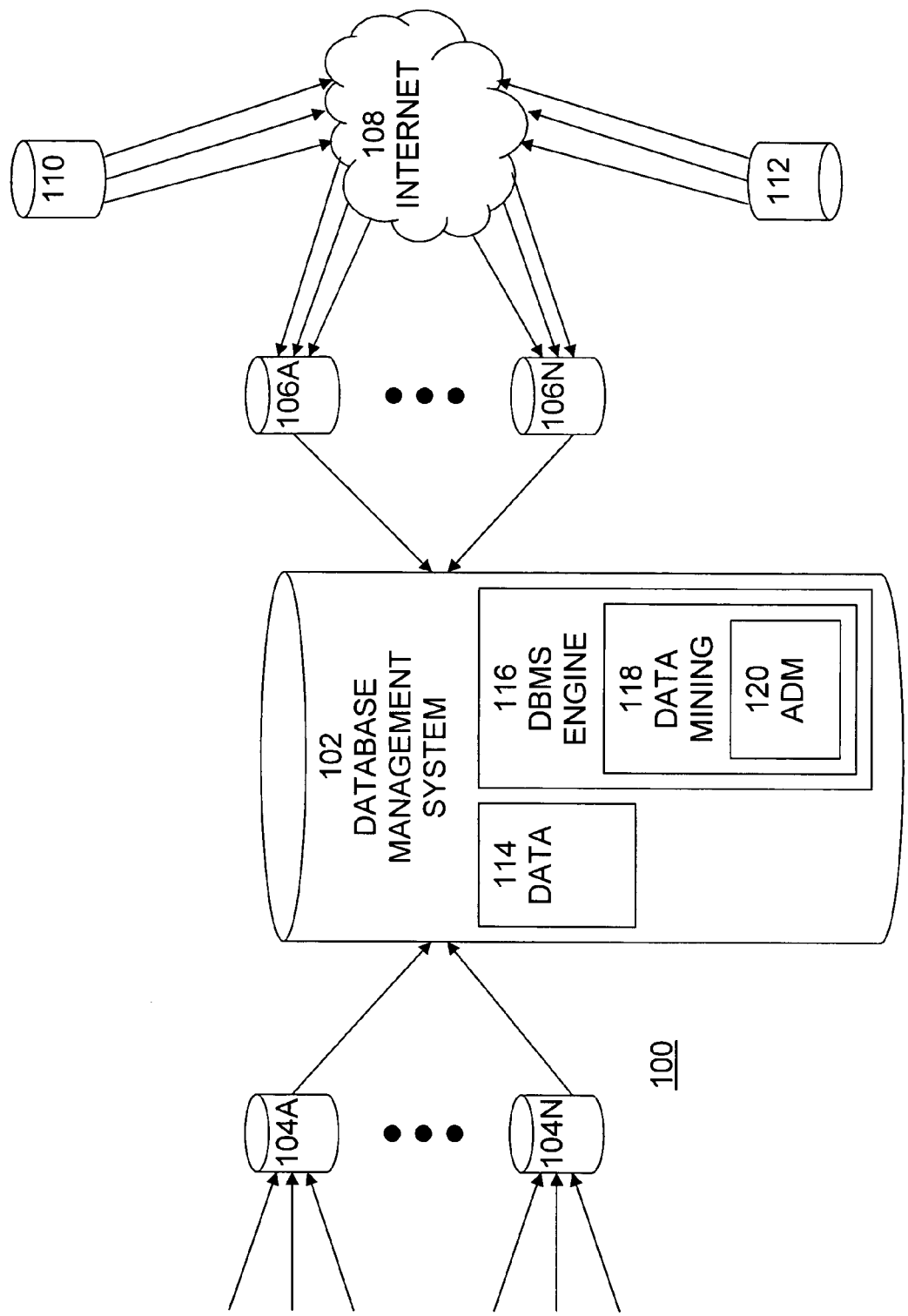
FIG. 1 is an exemplary block diagram of a system in which the present invention may be implemented.

An example of a system 100 in which the present invention may be implemented is shown in FIG. 1. As shown in FIG. 1, system 100 includes a database management system 102 that is connected to a variety of sources of data. For example, system 102 may be connected to a plurality of internal or proprietary data sources, such as systems 104A-104N. Systems 104A-104N may be any type of data source, warehouse, or repository, including those that are not publicly accessible. Examples of such systems include inventory control systems, accounting systems, scheduling systems, etc. Likewise, the sources of data may include database structures, such as relational tables/views in a relational database, multidimensional (OLAP) data, flat files (external tables), data streams, etc. System 102 may also be connected to a plurality of proprietary data sources that are accessible in some way over the Internet 108. Such systems include systems 106A-106N, shown in FIG. 1. Systems 106A-106N may be publicly accessible over the Internet 108, they may be privately accessible using a secure connection technology, or they may be both publicly and privately accessible. System 102 may also be connected to other systems over the Internet 108. For example, system 110 may be privately accessible to system 102 over the Internet 108 using a secure connection, while system 112 may be publicly accessible over the Internet 108.

In the embodiment shown in FIG. 1, data mining functionality is included in database management system 102. Database management system includes two main components, data 114, and database management system (DBMS) engine 116. Data 114 includes data, typically arranged as a plurality of data tables, as well as indexes and other structures that facilitate access to the data. DBMS engine 116 typically includes software that receives and processes queries of the database, obtains data satisfying the queries, and generates and transmits responses to the queries. DBMS engine 116 also includes data mining block 118, which provides DBMS engine 116 with the capability to obtain data and perform data mining processing on that data, so as to respond to requests for data mining processed data from one or more users.

DBMS engine includes 116 Automatic Data Mining (ADM) block 120. ADM block 120 includes the user-level and internal features that implement the functionality of the present invention. The invention automatically determines the type of technique (classification or regression) if it is a supervised (PREDICT) problem, selects the correct algorithm, performs the appropriated data preparation steps for the chosen algorithm, and tunes the model settings to obtain good accuracy.

Examples of user-level features that may be included in the Automatic Data Mining of the present invention are:
EXPLAIN—identifies attributes that are important/useful for explaining the variation on a target attribute of interest and provides a ranking of the attributes and a figure of merit.
PREDICT—produces predictions for unknown targets (classification and regression mining tasks are supported).
GROUP—clusters similar records together and provides description for the groups.
DETECT—identifies records in the data which are atypical, outliers, or anomalies.
PROJECT—projects the data to a space of lower dimensionality and provides descriptions of the newly created attributes.
DISCOVER—uncovers hidden patterns in the data and provides a list of discovered patterns.
COMPARE—compare the content of two data sources and produces a summary of the main differences and/or similarities discovered.

Examples of internal features that may be included in the Automatic Data Mining of the present invention are:
Support for unprepared input data by performing algorithm specific data preparation internally including:
discretization of continuous attributes for predict functionality
discretization of continuous attributes for explain functionality
normalization of continuous attributes for predict functionality
normalization of continuous attributes for group functionality (clustering)
missing values treatment for continuous and categorical attributes
outlier handling for continuous attributes
exclusion of categorical attributes that are identified as unique identifiers
sampling—generate randomized samples of input data to use for model building and testing
The following datatypes will be accepted in the input data
NUMBER
FLOAT
CHAR
VARCHAR2
DATE (Timestamp)
Nested columns
Smart model building
adjust model creation parameters based on input data statistics
Perform advanced data preparation techniques internally
discretization
outlier handling
missing value imputation
Support wide-data (greater than 1000 input attributes)

PREDICT, EXPLAIN, GROUP, DETECT, PROJECT, DISCOVER, and COMPARE are the main user-level features that may be included in the Automatic Data Mining of the present invention. In a preferred embodiment, these features are implemented as procedure calls in a suitable programming language. These procedures assume that the data input to them is in an unprepared form and perform transformations of the input data to prepare it for use in data mining. Various statistical measures are generated from the input data to determine which transformations should be performed. The procedures internally build data mining models, use these to generate results, and remove the data mining models before completion. Preferably, the only persisted objects for these procedures are the resulting tables.

The PREDICT feature produces predictions for unknown targets. The input data table should contain records where the target value is known (not null), in addition to records where the target value is not known. The known cases will be used to train and test a model. Any cases where the target is unknown, i.e. where the target value is null, will not be considered during model training. Once the model is built, it will be used to score all the records from the input data (both known and unknown), and a table will be persisted containing these results. In the case of binary classification, an ROC analysis of the results will be performed, and the predictions will be adjusted to optimize the trade-off between True Positive Rate (TPR) versus False Positive Rate (FPR).

An example of processing performed by the PREDICT feature includes: First, statistics are gathered on the incoming data which are used to determine the type of data mining problem (classification vs. regression) to be solved. Second, the incoming data is prepared by removing attributes recognized as unique identifiers. Only categorical (CHAR or VARCHAR2) columns can be determined to contain unique identifier like columns. An attribute will be considered unique if the number of distinct values divided by the number of total records (used during build) is greater than 0.5. Next, depending on which mining function was determined should be used (classification/regression), additional data preprocessing is performed in the form of data transformations. These include (but are not limited to) discretization, normalization, value mapping, outlier handling, missing values treatment etc. Next a data mining model is built using a data mining API. Only records where the target attribute is known (not NULL) will be used during the model build process. Next, the model is applied to all records of the incoming data. Finally, the apply results a processed to select the top one prediction for the case of classification. For binary classification, the predicted value will be based upon a probability threshold generated from an ROC (Receiver Operating Characteristics) analysis. The threshold will be chosen such that the trade-off between true positives and false positives is optimized. This is done by choosing a point on the ROC curve which minimizes the distance to the top left corner (value 0,1).

$$Distance=SQRT(SQR(1-TPF)+SQR(FPF))$$

For multi class classification, the prediction with the highest probability will be chosen. Finally, any temporarily created objects are removed.

An exemplary procedure interface for the PREDICT feature is:

```
PROCEDURE PREDICT(
    accuracy            OUT NUMBER,
    data_table_name     IN VARCHAR2,
    case_id_column_name IN VARCHAR2,
    target_column_name  IN VARCHAR2,
    result_table_name   IN VARCHAR2,
    data_schema_name    IN VARCHAR2 DEFAULT NULL);
``` wherein data_table_name is the name of the input data table or view, case_id_column_name is the name of the column identifying the cases in the input data, target_column_name is the name of the column to predict, result_table_name is the name of the table where the results are persisted, and data_schema_name is the name of the schema with the input data table/view. The accuracy parameter returns a value indicating the overall accuracy of the predictions generated by this operation.

An exemplary resulting table may include predictions based on the input data table and probabilities for the predictions.

An example of the use of the PREDICT feature is shown in FIG. 2. In this example, the regional sales manager for an automobile manufacturer wants to create a KPI (Key Performance Indicator) for understanding the performance of the dealerships in his region. To do this, he wants to investigate actual sales versus predicted sales on a weekly basis. Using internal dealership data (e.g. cars in inventory, number of test drives, number of loans approved, etc.) in conjunction with externally acquired data (e.g. consumer confidence index, weather, job less rate, etc.), a prediction can be made for the weekly sales for each dealership. These numbers could then be compared with the actual numbers indicating which dealerships exceeded expectations and which fell short, and presented using stoplight formatting in which different levels of variance from the predicted values are highlighted in different colors. This knowledge would help the sales manager identify under performing dealerships which may require additional investigation/action (e.g. on-going road construction in front of a dealership is impacting sales negatively, might be useful to support them in a promotional drive).

Another example of the use of the PREDICT feature is to plan a cross-sell marketing campaign. The goal is for existing customers to purchase a new product by offering one of three promotions (promo_1 through promo_3) during a campaign. Which promotion offer should be sent to which customer? By sending offers randomly to a sample of the customer base, the results can be used to better target the remaining customers. Once the results from the sample promotion drive are integrated with the customer data, the PREDICT feature can be used to determine which promotions should be offered to the remaining customers.

The EXPLAIN feature is used for identifying attributes that are important/useful for explaining the variation on an attribute of interest (e.g., a measure of an OLAP fact table). Only known cases (i.e. cases where the value of the explain column is not null) will be taken into consideration when assessing the importance of the input attributes upon the dependent attribute (attribute to be explained). The resulting table will contain one row for each of the input attributes.

An example of processing performed by the EXPLAIN feature includes: First, data preparation is performed on the incoming data in the form of data transformations. These transformations include (but are not limited to) discretization, normalization, value mapping, outlier handling, missing values treatment etc. Next an Attribute Importance [Attribute Importance] model is built using a data mining API. Only records where the target attribute is known (not NULL) will be used during the model build process. From the results of the model build, an output table is generated which provides explanatory power and rank for each attribute. Finally, any temporarily created objects are removed.

An exemplary procedure interface for the EXPLAIN feature is:

```
PROCEDURE EXPLAIN(
    data_table_name     IN VARCHAR2,
    explain_column_name IN VARCHAR2,
    result_table_name   IN VARCHAR2,
    data_schema_name    IN VARCHAR2 DEFAULT NULL);
``` wherein data_table_name is the name of the input data table or view, explain_column_name is the name of the column to explain, result_table_name is the name of the table where the results are persisted, and data_schema_name is the name of the schema with the input data table/view.

An exemplary resulting table may include values indicating how useful each attribute in the input data is for determining the value of the explained column. Higher values indicate greater explanatory power. Values may, for example, range from 0 to 1. The individual attributes' explanatory values are independent of other attributes included in the input dataset. Instead, the values are based on how strong each individual attribute correlates to the explained attribute. The value is affected by the number of records in the dataset, number of classes of the attribute and of course its values' relations to the explained column's values. An explanatory value of 0 suggests there is no useful correlation between the attribute's values and the explained attribute's values. In practice, it will rarely happen that an explanatory power=1 is returned. An exemplary resulting table may also include an explanatory power ranking (1 indicates the greatest explanatory power). Rows with equal values for the explanatory_value receive the same rank. Rank values are not skipped in the event of ties. Alternatively the resulting table may contain negative and positive values. Negative values indicate that the attribute inversely correlated with the target.

An example of the use of the EXPLAIN feature is shown in FIGS. 3a-e. In this example, a city's main revenue source is normally property taxes, which are based on property values. Higher property values mean more revenue to the city. Residents, or at least property owners, are (normally) equally interested in rising property values. Let's assume that city officials use median house values as a Key Performance Indicator and are interested in understanding what attributes most affect housing values. Data is gathered about houses with known values (Median Value*1000). The problem can be described as:

What are the factors that are most important in estimating the median house value?

How do the values of the most important attributes affect the median house value?

Figure 3D:
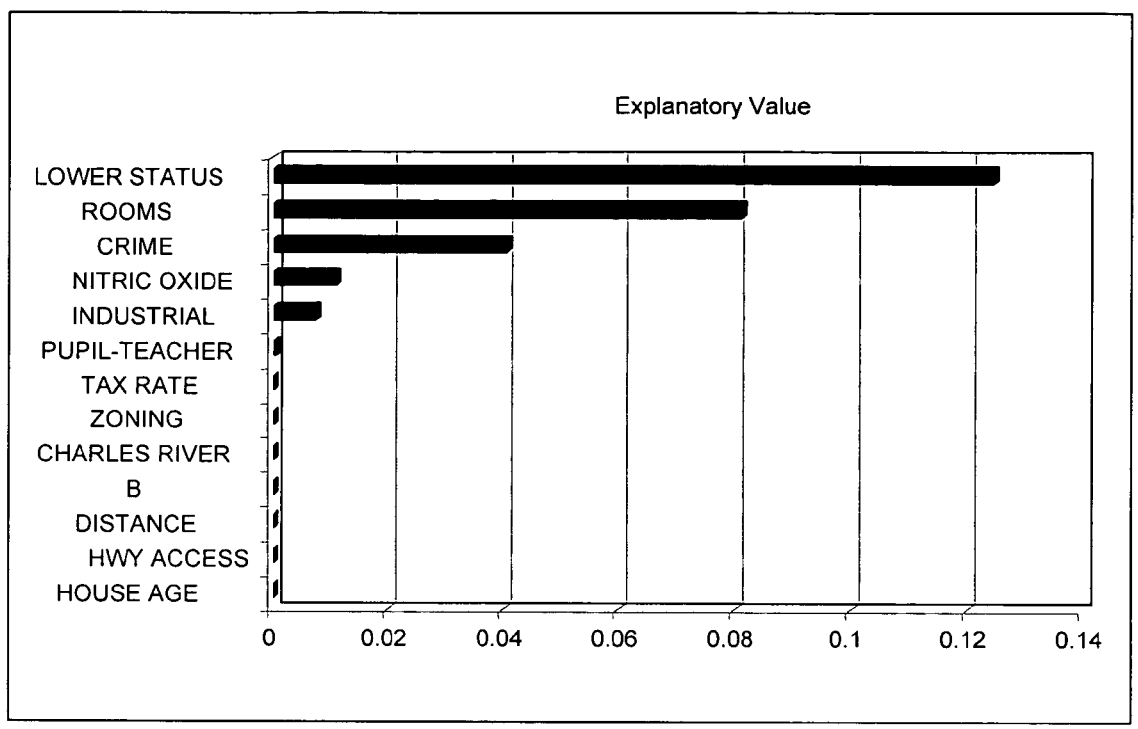
FIG. 3d is an example of results from the EXPLAIN feature shown in graphical form.

In this example the input data is in a table 302 having a schema, such as that shown in FIG. 3a. The EXPLAIN feature is invoked using a procedure call, such as procedure call 304, shown in FIG. 3b. The results of the EXPLAIN feature are output in a table, such as table 306, shown in FIG. 3c. The results of the EXPLAIN feature output in table 306 may also be shown in graphical form, such as is shown in FIG. 3d.

These results indicate that there are potentially useful relationships between attributes in the collected input data and the median house value. Attributes where the explanatory power is greater than zero are determined to provide useful data for the purpose of estimating the explained column. In this case, the attribute LOWER STATUS (percentage of households below U.S. Census Bureau's poverty thresholds) provides the greatest correlation with the target. So, the purpose of Explain is to identify which attributes provide useful information regarding the value of the target attribute.

Figure 3E:
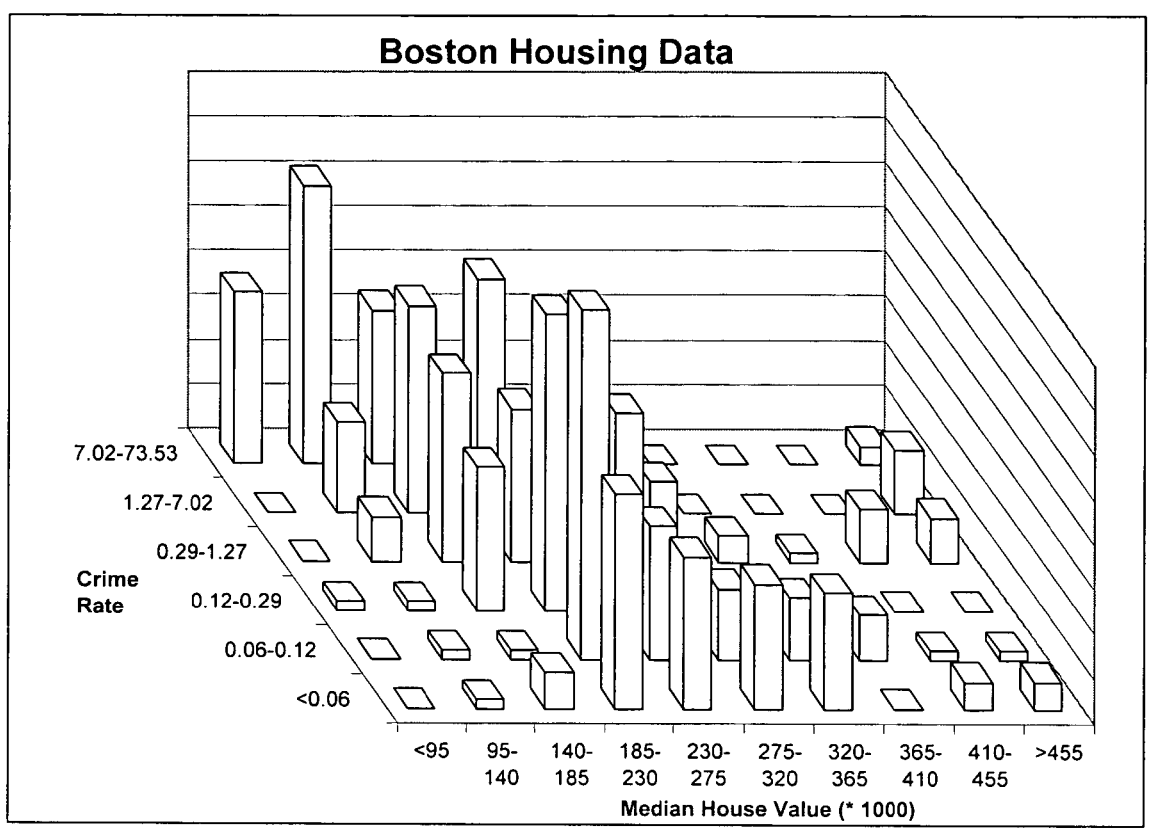
FIG. 3e is an example of the histogram for an individual attribute (crime rate) and the target column (median value).

If the user would like to understand HOW these attributes affect the value of the target, they could use a tool to generate histograms, such as that shown in FIG. 3e, etc. to provide this level of detail for the identified attributes. In this case, it may make sense for city officials to study how the crime rate affects the median house value, since this is something they can possibly affect over time. The height of each column is represented by counts of regions for the specific crime rate/median house value range.

An additional example of the use of the EXPLAIN feature is where a user wants to gather information regarding a certain measure, say sales, in a fact table. This measure is associated with numerous dimensions (e.g. time, customers, promotions, products etc.). The user in this case, is interested in determining which of the customer dimension attributes invoke the most influence on the measure of interest (sales) for a specific product. That is, which customer attributes commonly affect the purchase (or non-purchase) of this product. This may help guide the user through the process of understanding potential cross-sell opportunities to similar customers who have not purchased the item. Without providing guidance through the data exploration process, the user would have to drill-down and roll-up the data over various dimensions/attributes to try to find relevant and useful information. This normally results in a tedious if not impossible task since the user may be examining massive amounts of data without any specific direction. Alternatively, a user will follow their intuition or past heuristics as a guide during this process, potentially missing undiscovered relationships which can only be revealed by advanced data mining techniques processing large quantities of data, without preconceptions as to the attributes interdependencies.

Another example of the use of the EXPLAIN feature is where a user wants to determine if there is a correlation between the price of a specific product and the time dimension. It is possible that the user already expects that this type of correlation exists, however, EXPLAIN can identify more precisely, which time dimension attributes correlate the most to the product price (perhaps day_of_month, or week_day, etc.).

The GROUP feature is used for segmenting the data into groups of records that share similar characteristics. The group operation includes data preparation and generation and application of clustering data mining models. Once the model is built, it will be used to score all the records from the input data, and a group result table will be persisted. In addition, a details result table will be persisted providing information regarding the different groups.

An example of processing performed by the GROUP feature includes: First, preparing the incoming data by removing attributes recognized as unique identifiers. It then normalizes all numeric attributes. Note, all data preparation is done using database views, the original data passed in by the user will not be modified. A Clustering [Clustering] model is built using a data mining API. Next, the model is applied to all records of the incoming data. The results from the apply process are now processed to select the top 1 cluster prediction for each record. Finally, any temporarily created objects are removed.

An exemplary procedure interface for the GROUP feature is:

```
PROCEDURE GROUP(
    data_table_name          IN VARCHAR2,
    case_id_column_name      IN VARCHAR2,
    group_result_table_name  IN VARCHAR2,
    details_result_table_name IN VARCHAR2,
    number_of_groups         IN NUMBER,
    data_schema_name         IN VARCHAR2 DEFAULT NULL);
``` wherein data_table_name is the name of the input data table or view, case_id_column_name is the name of the column identifying the cases in the input data, group_result_table_name is the name of the table where the group id results are persisted, details_result_table_name is the name of the table where the group descriptions are persisted, and data_schema_ name is the name of the schema with the input data table/view.

The GROUP feature will preferably return two tables, a "group" table and a "details" table. The group table preferably includes information such as identification of the most likely group to which each record in the input table belongs and the probability that the record belongs to that group. The detail table preferably includes information such as identifications of groups, rules associated with the groups, attribute histograms for the records belonging to a group, centroids (attribute centers of mass) for each group, the conditions used to determine whether a value does or does not belong to a group, numeric or textual values for an attribute, and support for and confidence in each rule.

The DETECT feature is used for detecting rows in the data which are atypical, outliers, or anomalies. The DETECT operation includes data preparation and generation and application of one-class classifier data mining models. Once the model is built, it will be used to score all the records from the input data, and a DETECT result table will be persisted.

An example of processing performed by the DETECT feature includes: First, preparing the incoming data by removing attributes recognized as unique identifiers. It then normalizes all numeric attributes. Note, all data preparation is done using database views, the original data passed in by the user will not be modified. A one-class SVM classifier model is built using a data mining API. Next, the model is applied to all records of the incoming data. The results from the apply process are now processed to determine whether each record is an outlier or not. Finally, any temporarily created objects are removed.

An exemplary procedure interface for the DETECT feature is:

```
PROCEDURE DETECT(
    data_table_name         IN VARCHAR2,
    case_id_column_name     IN VARCHAR2,
    detect_result_table_name IN VARCHAR2,
    detection_rate          IN NUMBER,
    data_schema_name        IN VARCHAR2 DEFAULT NULL);
``` wherein data_table_name is the name of the input data table or view, case_id_column_name is the name of the column identifying the cases in the input data, detect_result_table_name is the name of the table where the DETECT results are persisted (0 if it is normal 1 if it is an outlier or anomalous row), detection_rate is rate of outliers desired, and data_schema_name is the name of the schema with the input data table/view. An exemplary resulting table may include predictions whether cases are anomalous or not and a measure of the degree of anomaly found. The degree of anomaly can then be used for ranking and identification of the most typical/atypical cases.

The PROJECT feature is used for projecting high-dimensional data down to a small number of new attributes constructed from the original ones. These new attributes can then be used for visualization or faster computations. The PROJECT operation includes data preparation and generation and application of a feature extraction (e.g., Non-Negative Matrix Factorization or Principal Component Analysis) data mining models. Once the model is built, it will be used to score all the records from the input data, and a PROJECT result table will be persisted. In addition, a details result table will be persisted providing information regarding the new attributes.

An example of processing performed by the PROJECT feature includes: First, preparing the incoming data by removing attributes recognized as unique identifiers. It then normalizes all numeric attributes. Note, all data preparation is done using database views; the original data passed in by the user will not be modified. A Non-negative Matrix Factorization model is built using a data mining API. Next, the model is applied to all records of the incoming data. The results from the apply process are persisted in the project results table. Finally, any temporarily created objects are removed.

An exemplary procedure interface for the PROJECT feature is:

```
PROCEDURE PROJECT(
    data_table_name          IN VARCHAR2,
    case_id_column_name      IN VARCHAR2,
    project_result_table_name IN VARCHAR2,
    number_of_new_attributes IN NUMBER,
    details_result_table_name IN VARCHAR2,
    data_schema_name         IN VARCHAR2 DEFAULT NULL);
``` wherein data_table_name is the name of the input data table or view, case_id_column_name is the name of the column identifying the cases in the input data, project_result_table_name is the name of the table where the project results are persisted, number_of_new_attributes is the number of attributes to project the data down, details_result_table_name is the name of the table where the descriptions of the new attributes are persisted, and data_schema_name is the name of the schema with the input data table/view.

The PROJECT feature will preferably return two tables, a "project" result table and a "details" result table. The project table may include the projections of the original data records in the new space of lower dimensionality. The details table may include information about the newly defined attributes (new coordinate bases).

The DISCOVER feature is used for discovering hidden patterns or associations in the data. It can be used to find patterns at the attribute level (similar to an EXPLAIN applied to each attribute as a target in turn) or at the attribute-value pair (or higher) level. This is similar to the result of an association rules data mining model output or a Bayesian Network model. The DISCOVER operation includes data preparation and generation and application of association rules data mining models. Once the model is built a DISCOVER result table will be persisted. This table will include the interesting patterns discovered by the DISCOVER feature.

An example of processing performed by the DISCOVER feature includes: First, preparing the incoming data by removing attributes recognized as unique identifiers. It bins all numeric attributes. Note, all data preparation is done using database views, the original data passed in by the user will not be modified. An association rules model is built using a data mining API. Next, the model content is retrieved and post-processed to a user-readable format. The results from the post-processing are persisted to the DISCOVER results table. Finally, any temporarily created objects are removed.

An exemplary procedure interface for the DISCOVER feature is:

```
PROCEDURE DISCOVER(
    data_table_name           IN VARCHAR2,
    case_id_column_name       IN VARCHAR2,
    discover_result_table_name IN VARCHAR2,
    interestingness_level     IN NUMBER,
    data_schema_name          IN VARCHAR2 DEFAULT NULL);
``` wherein data_table_name is the name of the input data table or view, case_id_column_name is the name of the column identifying the cases in the input data, discover_result_table_name is the name of the table where the DISCOVER results are persisted, interestingness_level is a number between 0 and 1 which controls the amount of output generated (higher values filter the output to fewer and more interesting patterns), and data_schema_name is the name of the schema with the input data table/view.

An exemplary resulting table may include a collection of the patterns discovered in the dataset. These patterns may be expressed at attribute or attribute-value pair level. Measures quantifying the support, confidence, and degree of interestingness may also be included.

The COMPARE feature is used for comparing two sets of records and returning the patterns they either share in common or that are markedly different in the two groups. The results of the COMPARE feature can be used to gain insight on what makes two sets of records similar or different. The COMPARE feature can also take an optional target column argument. In this case the comparison between the two groups of records is performed with respect to the explanation found in the records for the variations observed in the target attributes. The COMPARE operation includes data preparation and generation and application of individual association rules data mining models and, when the optional target is specified, supervised data mining models (e.g., Support Vector Machine, Linear and Logistic regression, and Naïve Bayes models) for each of the input data sets. Once the models are built, they are compared and an evaluation of key similarities and differences is produced. This evaluation can be at the attribute level or at the attribute-value pair level depending on the technique used. The results of the comparative analysis are persisted to the COMPARE results table with clear indication of what factors make the two sets similar or distinct.

An example of processing performed by the COMPARE feature when a target attribute is provided includes:

First, preparing the incoming data by removing attributes recognized as unique identifiers. It bins all numeric attributes for both datasets in the same way. Note, all data preparation is done using database views; the original data passed in by the user will not be modified. A Naïve Bayes model is built using a data mining API for each data set. Next the two models are compared and attribute-value-class conditional probabilities that are above a given threshold are marked as 1. The different patterns of 1s and 0s found in each model are compared and a summary of matches and mismatches ordered by target value is compiled as the result.

An exemplary procedure interface for the COMPARE feature is:

```
PROCEDURE COMPARE(
    data_table_name1           IN VARCHAR2,
    data_table_name2           IN VARCHAR2,
    case_id_column_name1       IN VARCHAR2,
    case_id_column_name2       IN VARCHAR2,
    compare_column_name        IN VARCHAR2,
    compare_result_table_name  IN VARCHAR2,
    comparison_criterion       IN NUMBER,
    data_schema_name           IN VARCHAR2 DEFAULT NULL);
``` wherein data_table_name1 and data_table_name2 are the names of the input data tables or views, case_id_column_name1 and case_id_column_name2 are the name of the columns identifying the cases in the first and second input data respectively, compare_column_name is the optional name of the column that will be used to drive the comparison, compare_result_table_name is the name of the table where the compare results are persisted, comparison_criterion indicates if SIMILARITIES, DIFFERENCES, or BOTH are reported in the result tables, and data_schema_name is the name of the schema with the input data table/view.

An exemplary resulting table may include a list of discovered patterns for each input table and a measure/indicator whether these patterns are common or different across the two data sources.

An internal feature that may be included in the Automatic Data Mining of the present invention may be termed Integrated Data Preparation. Integrated Data Preparation involves the specific data preparation steps that are performed on the input data.

For user-level features that take a target column (e.g., EXPLAIN, PREDICT, and COMPARE), statistics computed on the input data are used to determine the target type and the nature of the problem (classification or regression). For example, if the target has a data type of CHAR or VARCHAR2, the problem is considered a classification problem. If the target is NUMBER the problem can be either regression or classification. The following heuristic may be used to determine the problem type for NUMBER attributes (rules should be applied in order presented below):

1. If the target attribute has float numbers THEN REGRESSION ELSE go to rule 2. Float numbers can be identified by checking if SUM(ABS(value−floor(value)))=0. If this is true then there are no float values in the column.

2. For NUMBER type target attributes, if the targets cardinality as a percentage of the total number of training records is greater than 30%, than the mining function is considered to be regression.

Missing Values Treatment—when required by the underlying algorithm, missing values will be treated as part of the data preprocessing step. In one example of missing value treatment, missing values for numeric attributes will be replaced by the mean values over the dataset. Categorical attributes will be replaced by the mode (most frequent value for the attribute).

Outlier Handling—outliers will be handled as part of the discretization or normalization processes dependent on which underlying algorithm is used by in one of the user-level features.

Unique Identifiers—detection and removal of identifier-like attributes will be performed. Attributes will be categorized as unique identifiers if the number of unique values is greater than 50% of the number of training records for the attribute. (Training records are those where the target attribute is not null). Only attributes of categorical type (CHAR or VARCHAR2) will be treated.

Discretization—discretization (or binning) is used to map continuous values into discrete intervals. It may be performed depending on which underlying algorithm is used to implement a user-level feature. The statistics originally gathered on the incoming data are used to determine which type of binning mechanism to perform and the suitable parameters for the specific binning transformation.

Normalization—normalization involves remapping continuous values for a specific attribute to a scale between 0 and 1. For example, the numbers in original data ranging from 64.8 to 439.26 are mapped to be between 0 and 1. Numeric attributes may be normalized depending on which underlying algorithm is used to implement a user-level feature.

Figure 4A:
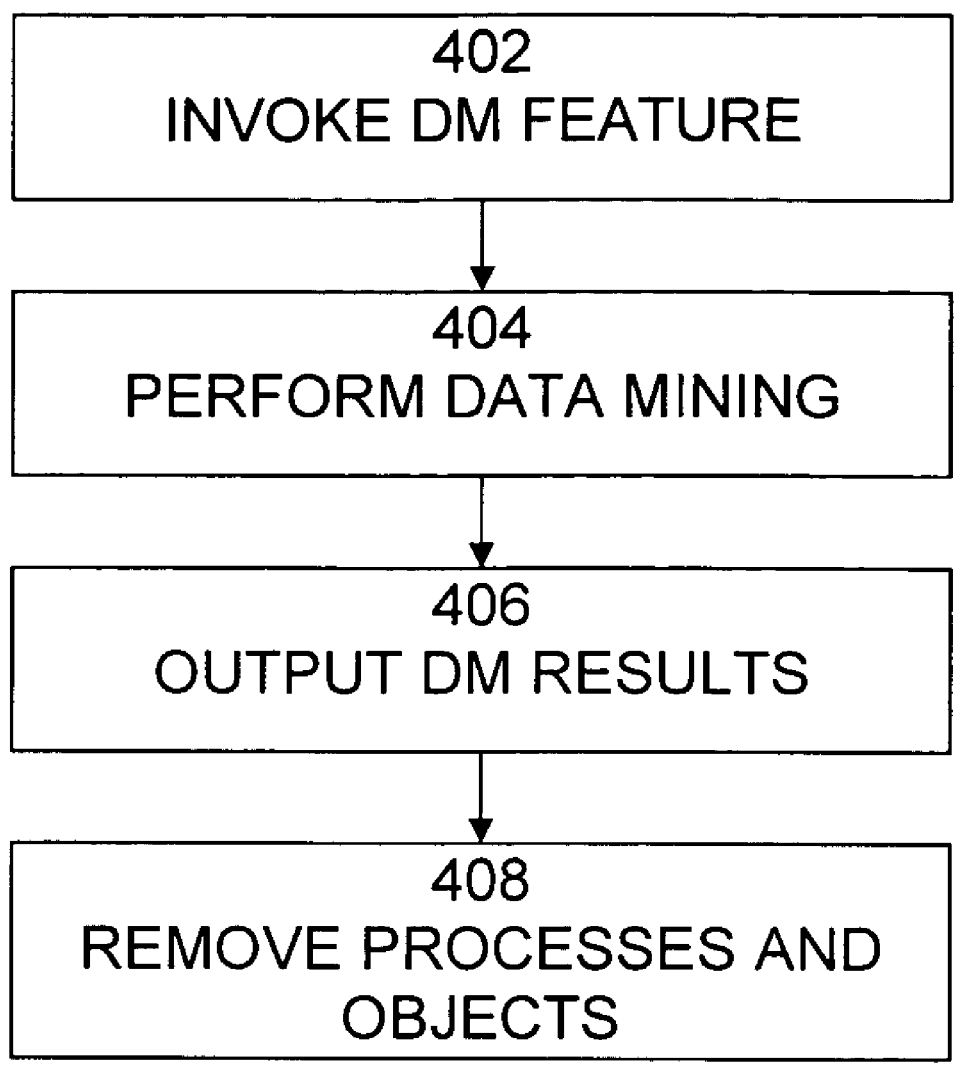
FIG. 4a is an exemplary flow chart of a data-centric automatic data mining process.

An exemplary flow chart of a data-centric automatic data mining process 400 is shown in FIG. 4a. To closely support the data-centric query paradigm familiar to database users, this process builds models on the fly. It also only requires a single data source as an input for supervised problems and can either produce static results that are persisted to a table or, through a view, dynamic results that, when queried, reflect the current data in the source table. Process 400 begins with step 402, in which a data mining feature is invoked to perform data mining on a data source. Only a single data source is required as an input for supervised problems. In step 404, data mining is performed on data from the data source using the data mining feature. The data mining feature only uses data mining processes and objects internal to the data mining feature and does not use data mining processes and objects external to the data mining feature. In step 406, data mining results are output from the data mining feature. The results that are output may be static results that are persisted to a table, or the results that are output may be dynamic results obtained through a view that, when queried, reflect the current data in the source table. In step 408 all data mining processes and objects internal to the data mining feature that were used to process the data from the data source are removed. It is to be noted that it is not necessary for the user to specify data preparation to be performed on the data source, regardless of the data source.

Figure 4B:
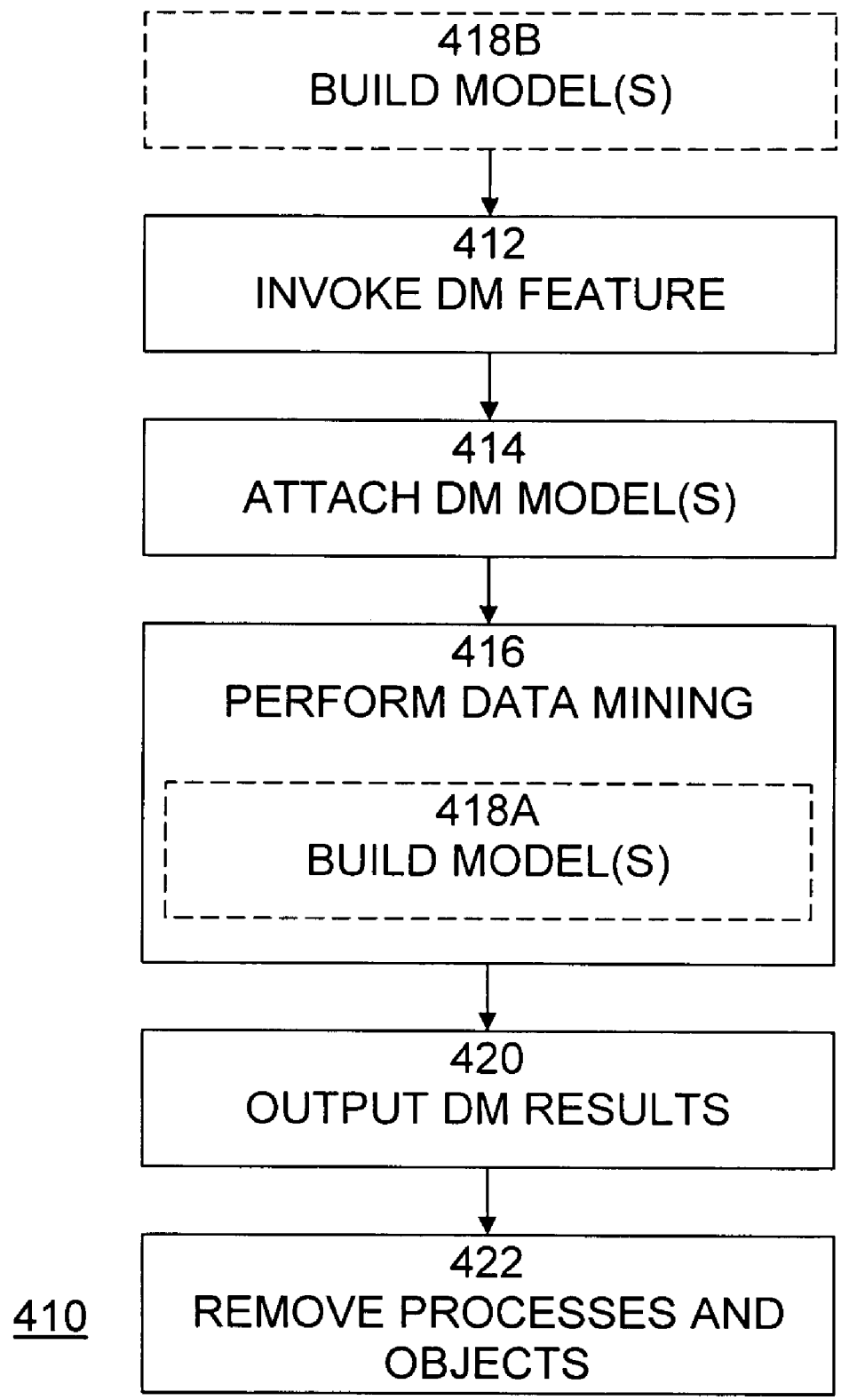
FIG. 4c is an exemplary flow chart of a process performed by the PREDICT, EXPLAIN, GROUP, DETECT, PROJECT, DISCOVER, and COMPARE features.

An exemplary flow chart of a data-centric automatic data mining process 410 is shown in FIG. 4b. In process 410, a data mining model is attached to the data source and mirrors the process of building a functional index. Process 410 begins with step 412, in which a data mining feature is invoked to perform data mining on a data source. In step 414, the existing data mining model(s) are attached to the instance of the data mining feature. In step 416, data mining is performed on data from the data source using the data mining feature. In one embodiment, the data mining model is built on the fly, hidden from the user, during performance of the data mining feature, at the functional index construction time, shown as step 418A. In another embodiment, the model is pre-built elsewhere and attached to the table at the index construction time, shown as step 418B. In step 420, data mining results are output from the data mining feature. The results that are output may be static results that are persisted to a table, or the results that are output may be dynamic results obtained through a view that, when queried, reflect the current data in the source table. In step 422 all data mining processes and objects internal to the data mining feature that were used to process the data from the data source are removed.

This approach can be used in conjunction with an operator-based implementation of the invention. If the operator-based implementation is invoked without the index-building step the methodology is fully executed. If a functional index has already been provided then the results are already computed and only need to be retrieved. Much like the execution of complex queries, if an index has been created the query returns results more quickly, otherwise the processing can take a significant amount of time.

Figure 4C:
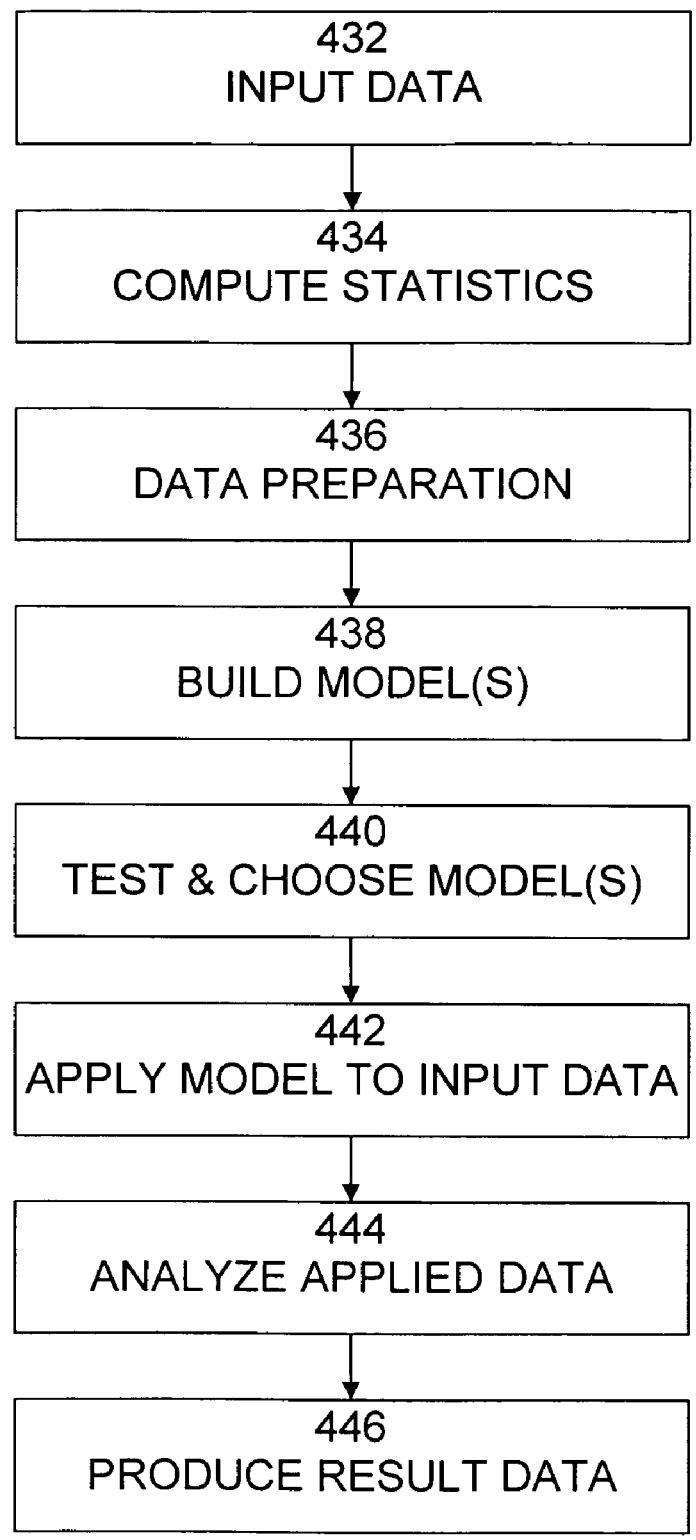

An exemplary flow chart of a process 430 performed by the PREDICT, EXPLAIN, GROUP, DETECT, PROJECT, DISCOVER, and COMPARE features is shown in FIG. 4. Process 430 begins with step 432, in which data is input to the ADM processing of the present invention. Typically, the input data is the one or more data tables specified in the procedure call that is used to invoke the ADM feature being used. In step 434, various statistical measures are generated from the input data to determine which data mining models should be built, which transformations should be performed and to determine how to adjust model creation parameters based on the input data statistics. In step 436, advanced data preparation is performed. Such data preparation may include discretization of continuous attributes, outlier handling, normalization of continuous attributes, missing values treatment for continuous and categorical attributes, and randomized sampling of input data to use for model building and testing.

In step 438, one or more data mining models is built using the input data or the sampling of the input data. The statistics that were generated on the input data are used to adjust model creation parameters. In step 440, the generated models are tested and the one or more models that produce the best quality results are chosen for use. Step 440 applies only to PREDICT functionality. In step 442, the chosen model or models are applied to the input data. In step 444, the data resulting from the apply of the chosen model or models to the input data are analyzed. Step 444 applies only to PREDICT functionality. In step 446, the result data from process 430 is produced from the data resulting from the apply of the chosen model or models based on the analysis of that data.

An exemplary block diagram of a database management system 102, shown in FIG. 1, is shown in FIG. 5. System 102 is typically a programmed general-purpose computer system, such as a personal computer, workstation, server system, and minicomputer or mainframe computer. System 102 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which System 102 is implemented as a single multi-processor computer system, in which multiple processors 502A-502N share system resources, such as memory 508, input/output circuitry 504, and network adapter 506. However, the present invention also contemplates embodiments in which System 102 is implemented as a plurality of networked computer systems, which may be single-processor computer systems, multi-processor computer systems, or a mix thereof.

Input/output circuitry 504 provides the capability to input data to, or output data from, database/System 102. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces database/System 102 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of system 102. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 508 varies depending upon the function that system 102 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 5, memory 508 includes data 114, and database management system (DBMS) engine 116. Data 114 includes data, typically arranged as a plurality of data tables, as well as indexes and other structures that facilitate access to the data. DBMS engine 116 includes database management routines, which is software that receives and processes queries of the database, obtains data satisfying the queries, and generates and transmits responses to the queries. DBMS engine 116 also includes data mining routines 118, which provides DBMS engine 116 with the capability to obtain data and perform data mining processing on that data, so as to respond to requests for data mining processed data from one or more users.

DBMS engine 116 includes Automatic Data Mining (ADM) block 120. ADM block 120 includes the user-level and internal features that implement the functionality of the present invention. The invention automatically determines the type of technique (classification or regression) if it is a supervised problem, selects the correct algorithm, performs the appropriated data preparation steps for the chosen algorithm, and tunes the model settings to obtain good accuracy.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer program product comprising a computer-readable storage medium comprising computer program instructions that when executed by a processor implement a method for data-centric data mining comprising:
    selecting a data mining feature from a provided group of data mining features to perform data mining on a data source;
    performing data mining on data from the data source using the selected data mining feature, wherein the data mining feature uses data mining processes and objects internal to the data mining feature and does not use data mining processes and objects external to the data mining feature, and wherein the processing performed within the data mining feature comprises automatically determining a type of data mining technique, automatically determining whether the data mining processing is a supervised problem, automatically selecting an algorithm for a data mining model, automatically preparing the data from the data source for the use with the selected algorithm, automatically tuning settings of the data mining model, and automatically applying the data mining model to the data from the data source to generate data mining results;
    outputting data mining results from the selected data mining feature; and
    removing all data mining processes and objects internal to the selected data mining feature that were used to process the data from the data source,
    wherein the provided group of data mining features comprises:
    a data mining feature that identifies attributes that are important or useful for explaining variation on a target attribute of interest and that provides a ranking of the attributes and a figure of merit;
    a data mining feature that produces predictions for unknown targets for classification mining tasks and regression mining tasks, and a figure of merit indicating the overall quality of the predictions;
    a data mining feature that clusters similar records together and provides description for the groups;
    a data mining feature that identifies records in the data from the data source that are atypical, outliers, or anomalies;
    a data mining feature that projects the data from the data source to a space of lower dimensionality and provides description of newly created attributes;
    a data mining feature that uncovers hidden patterns in the data from the data source and provides a list of discovered patterns; and
    a data mining feature that compares content of two data sources and produces a summary of differences and similarities discovered.

2. The computer program product of claim 1, wherein the user does not need to specify data preparation to be performed on the data source, regardless of the data source.

3. The computer program product of claim 2, wherein the data mining features perform tasks based on needs and perspectives of the user without exposing to the user data mining specific terminologies and methodologies.

4. The computer program product of claim 1, wherein the data mining is performed by:
receiving data upon which to perform data mining processing;
computing statistics on the received data;
building a data mining model using the received data and based on the computed statistics;
determining a quality of results of the built data mining model;
selecting a data mining model based on the determined quality of results; and
applying the selected data mining model to the received data to generate applied data.

5. The computer program product of claim 4, wherein computing the statistics comprises:
computing a number of distinct values for each predictor attribute and the target attribute;
computing a number of total records included in the input training data;
computing bin boundaries when discretization is performed; and
computing shift and scale values for attributes where normalization is performed.

6. The computer program product of claim 4, wherein building a data mining model based on the computed statistics comprises:
determining an appropriate data mining function and algorithm to be used;
providing parameters to a build process of the data mining model so as to generate an optimal model;
selecting a data mining model based on the computed statistics; and
adjusting model creation parameters of the selected model based on the computed statistics.

7. The computer program product of claim 4, wherein determining a quality of results of the built data mining model comprises:
evaluating results of the built data mining models using a confusion matrix, for classification models; and
evaluating results of the built data mining models using computed measures of accuracy of the built data mining models, for regression models.

8. The computer program product of claim 5, wherein the computed measures of accuracy include at least one of a mean absolute error or a root mean square error, for regression models.

9. The computer program product of claim 4, further comprising:
preparing the received data before building the data mining model.

10. The computer program product of claim 9, wherein preparing the received data comprises at least one of discretization of continuous attributes, outlier handling, normalization of continuous attributes, missing values treatment for continuous and categorical attributes, and randomized sampling of input data to use for model building and testing.

11. The computer program product of claim 4, further comprising:
analyzing the applied data resulting from applying the selected data mining model to the received data.

12. The computer program product of claim 11, wherein analyzing the applied data comprises:
if the data mining model is a binary classification data mining model, performing receiver operating characteristics analysis of the applied data to generate predictions, and adjusting the predictions to support an optimal probability threshold resulting in a best trade-off between True Positive Rate and False Positive Rate.

13. The computer program product of claim 12, further comprising:
producing result data based on the analyzed applied data.

14. The computer program product of claim 13, wherein producing result data comprises:
generating a result table based on the analyzed applied data wherein an optimized probability threshold is used to determine a prediction.

15. The computer program product of claim 4, wherein the method is used to produce predictions for known and unknown targets.

16. The computer program product of claim 15, wherein the received data contains records where the target value is known and records where the target value is not known.

17. The computer program product of claim 16, wherein building the data mining model comprises:
building the data mining model using only the records where the target value is known.

18. The computer program product of claim 17, wherein applying the selected data mining model comprises:
scoring the data mining model using both the records where the target value is known and the records where the target value is not known.

19. The computer program product of claim 1, wherein the data mining is performed by:
clustering similar records together; and
providing description for the groups.

20. The computer program product of claim 19, wherein the clustering is performed using a pre-defined number of clusters or finding a number of clusters automatically.

21. The computer program product of claim 19, wherein the description includes at least one of:
a centroid described by a mean, for numeric attributes, or a mode, for categorical attributes;
a representative case for the cluster;
a histogram; and
a rule description of the cluster.

22. The computer program product of claim 1, wherein the data mining is performed by identifying records in the data from the data source that are atypical, outliers, or anomalies.

23. The computer program product of claim 22, wherein a measure of anomaly for each row is determined.

24. The computer program product of claim 1, wherein the data mining is performed by:
projecting the data from the data source to a space of lower dimensionality; and
providing description of newly created attributes.

25. The computer program product of claim 24, wherein a number of projections can be user specified or automatically determined.

26. The computer program product of claim 1, wherein the data mining is performed by:
uncovering hidden patterns in the data from the data source; and
providing a list of discovered patterns.

27. The computer program product of claim 26, wherein the list of discovered patterns is defined at an attribute level or at an attribute/value pair level.

28. The computer program product of claim 1, wherein the data mining is performed by:
comparing content of two data sources; and
producing a summary of differences and similarities discovered.

29. The computer program product of claim 28, wherein the summary comprises discovered similarities, discovered dissimilarities, or both discovered similarities and discovered dissimilarities.

30. The computer program product of claim 1, wherein the data source comprises at least one of a relational table or view in a relational database, multidimensional (OLAP) data, a flat file (external tables), or a data streams.

31. A computer program product comprising a computer-readable storage medium comprising computer program instructions that when executed by a processor implement a method for data-centric data mining comprising:

attaching an existing data mining model to the data source;

providing a group of data mining features comprising an EXPLAIN data mining feature that identifies attributes that are important or useful for explaining variation on a target attribute of interest and that provides a ranking of the attributes and a figure of merit, a PREDICT data mining feature that produces predictions for unknown targets for classification mining tasks and regression mining tasks, a GROUP data mining feature that clusters similar records together and provides description for the groups, a DETECT data mining feature that identifies records in the data from the data source that are atypical, outliers, or anomalies, a PROJECT data mining feature that projects the data from the data source to a space of lower dimensionality and provides description of newly created attributes, a DISCOVER data mining feature that uncovers hidden patterns in the data from the data source and provides a list of discovered patterns and a COMPARE data mining feature that compares content of two data sources and produces a summary of differences and similarities discovered;

selecting a data mining feature from the provided group of data mining features to perform data mining on a data source;

performing data mining on data from the data source using the selected data mining feature;

outputting data mining results from the data mining feature; and removing all data mining processes and objects internal to the data mining feature that were used to process the data from the data source, with the exception of the model attached to the data source.

32. The computer program product of claim 31, wherein performing data mining comprises building a data mining model on the fly at functional index construction time.

33. The computer program product of claim 32, wherein the data mining model is automatically updated as the data in the data source is changed.

34. The computer program product of claim 31, wherein performing data mining comprises using a data mining model that was built prior to invoking the data mining feature.

35. The computer program product of claim 31, wherein the user does not need to specify data preparation to be performed on the data source, regardless of the data source.

36. The computer program product of claim 32, wherein the data mining features perform tasks based on needs and perspectives of the user without exposing to the user data mining specific terminologies and methodologies.

37. The computer program product of claim 31, wherein the data mining is performed by:

receiving data upon which to perform data mining processing;

computing statistics on the received data;

building a data mining model using the received data and based on the computed statistics;

determining a quality of results of the built data mining model;

selecting a data mining model based on the determined quality of results; and applying the selected data mining model to the received data to generate applied data.

38. The computer program product of claim 37, wherein computing the statistics comprises:

computing a number of distinct values for each predictor attribute and the target attribute;

computing a number of total records included in the input training data;

computing bin boundaries when discretization is performed; and computing shift and scale values for attributes where normalization is performed.

39. The computer program product of claim 37, wherein building a data mining model based on the computed statistics comprises:

determining an appropriate data mining function and algorithm to be used;

providing parameters to a build process of the data mining model so as to generate an optimal model;

selecting a data mining model based on the computed statistics; and adjusting model creation parameters of the selected model based on the computed statistics.

40. The computer program product of claim 37, wherein determining a quality of results of the built data mining model comprises:

evaluating results of the built data mining models using a confusion matrix, for classification models; and evaluating results of the built data mining models using computed measures of accuracy of the built data mining models, for regression models.

41. The computer program product of claim 40, wherein the computed measures of accuracy include at least one of a mean absolute error or a root mean square error, for regression models.

42. The computer program product of claim 37, further comprising:

preparing the received data before building the data mining model.

43. The computer program product of claim 42, wherein preparing the received data comprises at least one of discretization of continuous attributes, outlier handling, normalization of continuous attributes, missing values treatment for continuous and categorical attributes, and randomized sampling of input data to use for model building and testing.

44. The computer program product of claim 37, further comprising:

analyzing the applied data resulting from applying the selected data mining model to the received data.

45. The computer program product of claim 44, wherein analyzing the applied data comprises:

if the data mining model is a binary classification data mining model, performing receiver operating characteristics analysis of the applied data to generate predictions, and adjusting the predictions to support an optimal probability threshold resulting in a highest True Positive Rate versus False Positive Rate.

46. The computer program product of claim 45, further comprising:

producing result data based on the analyzed applied data.

47. The computer program product of claim 46, wherein producing result data comprises:

generating a result table based on the analyzed applied data wherein a probability threshold is used to determine an optimal prediction.

48. The computer program product of claim 37, wherein the method is used to produce predictions for known and unknown targets.

49. The computer program product of claim 48, wherein the received data contains records where the target value is known and records where the target value is not known.

50. The computer program product of claim 49, wherein building the data mining model comprises:
building the data mining model using only the records where the target value is known.

51. The computer program product of claim 50, wherein applying the selected data mining model comprises:
scoring the data mining model using both the records where the target value is known and the records where the target value is not known.

52. The computer program product of claim 29, wherein the data mining is performed by:
clustering similar records together; and
providing description for the groups.

53. The computer program product of claim 52, wherein the clustering is performed using a pre-defined number of clusters or finding a number of clusters automatically.

54. The computer program product of claim 52, wherein the description includes at least one of:
a centroid described by a mean, for numeric attributes, or a mode, for categorical attributes;
a representative case for the cluster;
a histogram; and
a rule description of the cluster.

55. The computer program product of claim 31, wherein the data mining is performed by identifying records in the data from the data source that are atypical, outliers, or anomalies.

56. The computer program product of claim 55, wherein a measure of anomaly for each row is determined.

57. The computer program product of claim 31, wherein the data mining is performed by:
projecting the data from the data source to a space of lower dimensionality; and
providing description of newly created attributes.

58. The computer program product of claim 57, wherein a number of projections can be user specified or automatically determined.

59. The computer program product of claim 31, wherein the data mining is performed by:
uncovering hidden patterns in the data from the data source; and
providing a list of discovered patterns.

60. The computer program product of claim 59, wherein the list of discovered patterns is defined at an attribute level or at an attribute/value pair level.

61. The computer program product of claim 31, wherein the data mining is performed by:
comparing content of two data sources; and
producing a summary of differences and similarities discovered.

62. The computer program product of claim 61, wherein the summary comprises discovered similarities, discovered dissimilarities, or both discovered similarities and discovered dissimilarities.

63. The computer program product of claim 31, wherein the data source comprises at least one of a relational table or view in a relational database, multidimensional (OLAP) data, a flat file (external tables), or a data streams.

* * * * *

UNITED STATES PATENT AND TRADEMARK OFFICE
CERTIFICATE OF CORRECTION

| | |
|---|---|
| PATENT NO. | : 7,627,620 B2 |
| APPLICATION NO. | : 11/012350 |
| DATED | : December 1, 2009 |
| INVENTOR(S) | : Marcos M. Campos et al. |

It is certified that error appears in the above-identified patent and that said Letters Patent is hereby corrected as shown below:

In column 12, line 22, delete "number_of new_attributes" and insert -- number_of_new_attributes --, therefor.

In column 13, line 42, delete "Is and Os" and insert -- 1s and 0s --, therefor.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,627,620 B2  
APPLICATION NO. : 11/012350  
DATED : December 1, 2009  
INVENTOR(S) : Campos et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Second Day of November, 2010

David J. Kappos
*Director of the United States Patent and Trademark Office*